(12) United States Patent
Napolitano

(10) Patent No.: US 8,708,795 B2
(45) Date of Patent: Apr. 29, 2014

(54) METHOD AND SYSTEM FOR FACILITATING EXTENDED PLAY OF A WAGERING GAME

(75) Inventor: Thomas J. Napolitano, East Greenwich, RI (US)

(73) Assignee: GTECH Corporation, Providence, RI (US)

(*) Notice: Subject to any disclaimer, the term of this patent is extended or adjusted under 35 U.S.C. 154(b) by 1016 days.

(21) Appl. No.: 12/411,975

(22) Filed: Mar. 26, 2009

(65) Prior Publication Data

US 2009/0247259 A1 Oct. 1, 2009

Related U.S. Application Data

(60) Provisional application No. 61/070,988, filed on Mar. 26, 2008.

(51) Int. Cl.
*A63F 9/24* (2006.01)
*A63F 13/00* (2014.01)
*G06F 17/00* (2006.01)
*G06F 19/00* (2011.01)

(52) U.S. Cl.
USPC .............................................. 463/18; 438/20

(58) Field of Classification Search
USPC ........................................................ 463/18, 20
See application file for complete search history.

(56) References Cited

U.S. PATENT DOCUMENTS

| 2002/0115488 | A1* | 8/2002 | Berry et al. ............... 463/42 |
| 2007/0184887 | A1 | 8/2007 | Cannon |
| 2008/0032764 | A1* | 2/2008 | Cannon ..................... 463/16 |
| 2008/0113765 | A1* | 5/2008 | DeWaal ..................... 463/25 |
| 2009/0117969 | A1* | 5/2009 | Englman ................... 463/20 |

* cited by examiner

*Primary Examiner* — William M. Brewster
(74) *Attorney, Agent, or Firm* — Sullivan & Worcester LLP; Christopher T. McWhinney

(57) ABSTRACT

Systems and methods for facilitating one or more base wagering games in an extended format are provided. Outcomes for the base wagering game may be determined, and based on the outcomes, player rankings in the extended play wagering game may be determined.

16 Claims, 8 Drawing Sheets

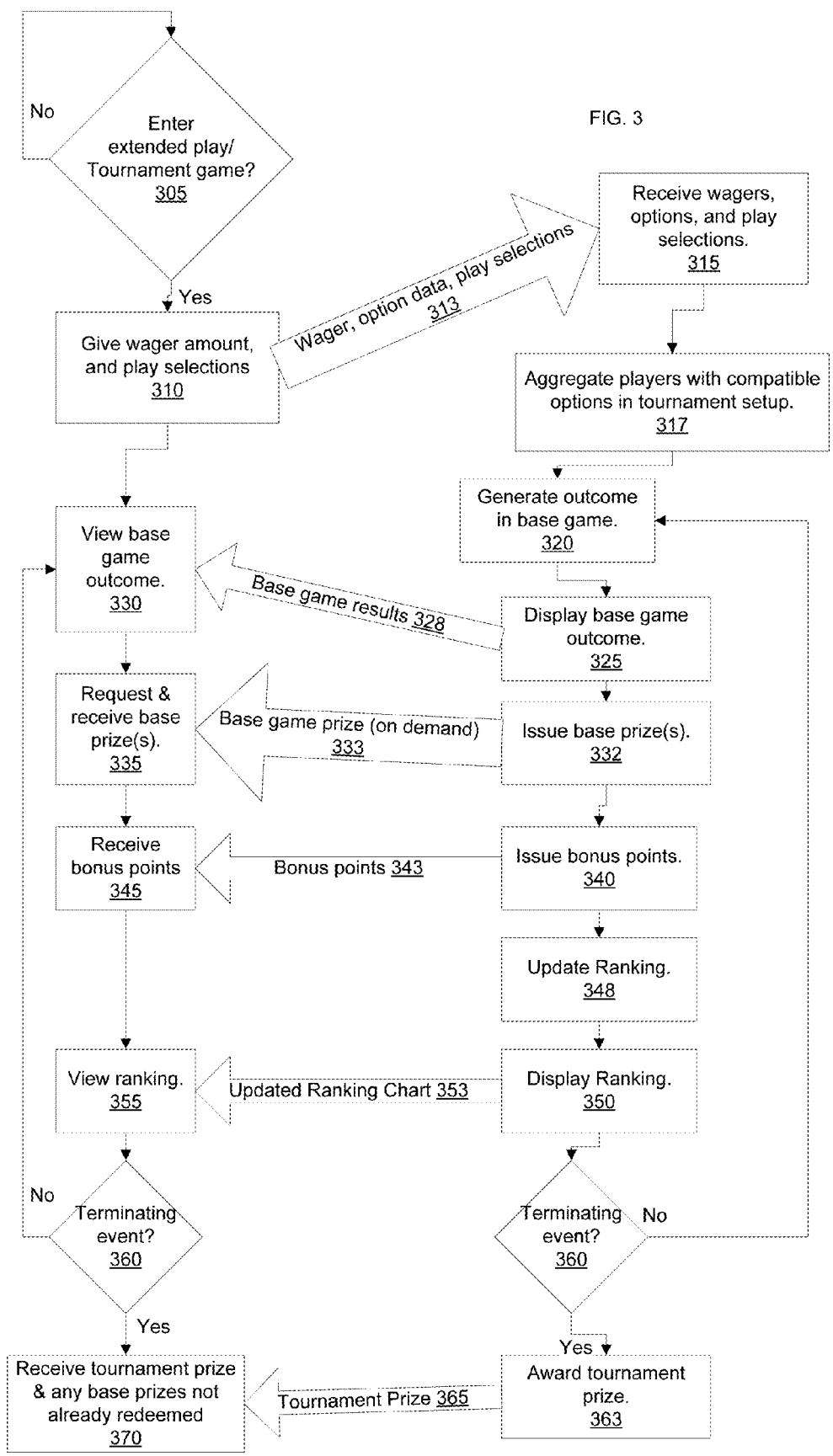

TOURNAMENT KENO FOOTBALL
LEADERBOARD

Home　　How To Play　Standings　Login

Now you can play Keno against other online. Purchase a Tournament Keno ticket at any Lottery Retailer and then go to www.tournamentkeno.com to watch the action in real time. Each time you match a number you earn a point. The top ranked players at the end of each game win a prize.

CURRENT STANDINGS

| RANK | ENTRY | POINTS | TOKENS USED | WIN PCT | CHANCE+/- |
|---|---|---|---|---|---|
| 1 | 167443 | 4160 | 56 | 95.2 | +2 |
| 2 | 148486 | 4140 | 43 | 94.7 | -2 |
| 3 | 132264 | 4110 | 19 | 94.4 | 0 |
| 4 | 167564 | 4090 | 9 | 93.3 | +7 |
|   | 184897 | 4090 | 28 | 93.3 | +3 |
| 6 | 146578 | 4070 | 36 | 86.3 | -4 |
| 7 | 153222 | 4010 | 3 | 77.6 | 0 |
|   | 159468 | 4010 | 18 | 77.6 | +4 |
|   | 159519 | 4010 | 46 | 77.6 | +1 |
|   | 167753 | 4010 | 11 | 77.6 | -3 |
| 11 | 159753 | 3950 | 0 | 75.5 | 0 |
| 12 | 156664 | 3920 | 27 | 75.1 | 0 |
|   | 157003 | 3920 | 4 | 75.1 | +17 |
| 14 | 161161 | 3860 | 30 | 69.2 | -6 |
| 15 | 164873 | 3840 | 2 | 62.0 | +5 |

FIG.6

METHOD AND SYSTEM FOR FACILITATING EXTENDED PLAY OF A WAGERING GAME

RELATED APPLICATION AND PRIORITY CLAIM

This application claims priority under 35 U.S.C. 119(e) to provisional patent application 61/070,988 filed Mar. 26, 2008. The entire disclosure of said provisional application is incorporated by reference herein by reference thereto.

BACKGROUND INFORMATION

Number selection games like Keno have long been a staple for the gaming industry. They are played in many ways: on physical boards, with bingo like player cards and numbered balls, by individual players at individual machines as a video game, as casino, Keno parlor, or other venue-wide games, or as online lottery games available in various locations, such as bars, throughout a jurisdiction. They are simple to understand and desirable to players despite traditionally having one of the highest profit margins for operators, making them very desirable to operators.

One feature that makes Keno and other online lottery games popular is the fact that they take place over a period of time. Thus, they provide relatively continuous entertainment over a period of time. Numbers are constantly being drawn, and multiple drawings occur at regular intervals. This is different than games, such as Powerball, that focus on a single big drawing event, or Instant Lottery tickets which provide an immediate play experience, but generally do not provide entertainment over an extended time period. Accordingly, Keno and other online lottery games are particularly popular in bars and social locations, where players socialize and play Keno at the same time.

Although tickets for online wagering games, like Keno, can sometimes be purchased on one visit to a location, and then redeemed on a later date, entries are typically not played over an extended period of multiple days with a very large number of draws. Also, although online wagering games, like Keno, are often played socially, e.g., in bars or restaurants, the game that is typically provided does not allow for competition between players.

SUMMARY

One example embodiment of the present invention includes a method of facilitating the play of an extended play competitive wagering game based on a base wagering game. The example method will receive wagers from a plurality of players in the extended play wagering game. The example method will repeatedly determining an outcome of a round of the base wagering game. In response to determining the outcome of the round of the base wagering game, the example method will update a player ranking of the plurality of players based on the determined outcome of the base wagering game, the ranking based on aggregate results of each player over the rounds of the base wagering game that have occurred. The example method will display a ranking of the plurality of players based on the outcome of the rounds of the base wagering game that have already occurred, and at the conclusion of all of the rounds of play of the base wagering game, awarding one of the players a prize based on the player's ranking after the final round of the base wagering game.

Optionally, in addition to or instead of the other optional features, in the example method, players may also receive prizes for their results in the base wagering game, the prizes may be independent of the results achieved by other players in the base wagering game.

Optionally, in addition to or instead of the other optional features, in the example method, the base wagering game is an online numbers draw game.

Optionally, in addition to or instead of the other optional features, in the example method, the base wagering game is Keno.

Optionally, in addition to or instead of the other optional features, the example method may include displaying base game results and player rankings over the Internet.

Optionally, in addition to or instead of the other optional features, in the example method, the base wagering game is an online numbers draw game, and the ranking is based on a total quantity of number matches made by players in all the base wagering games that have been completed.

Optionally, in addition to or instead of the other optional features, in the example method the receiving wagers may include receiving selections of numbers, which may be matched in an online numbers draw game.

Optionally, in addition to or instead of the other optional features, the example method may include awarding the player a bonus prize, based on at least one of a base wagering game round outcome or the player's ranking.

Optionally, in addition to or instead of the other optional features, the example method may include conducting a bonus game in parallel with the plurality of base games and the extended play game, where the likelihood of a player winning the bonus game may depend in part on the player's received outcomes in the base game and the extended play game.

Optionally, in addition to or instead of the other optional features, the example method may include awarding bonus tokens to a player based on at least one of their outcome one of the base games or their ranking in the extended play game, the bonus tokens usable at the discretion of a player to increase their expected payout in the bonus game.

Optionally, in addition to or instead of the other optional features, in the example method, the bonus game may have a sports theme with characters who have performance attributes, the likelihood of a player winning the bonus game depending on the attributes of the player's assigned characters.

Optionally, in addition to or instead of the other optional features, in the example method, the tokens may be used to increase fictional character attributes in the sports-themed game.

Another example embodiment of the present invention includes a method of facilitating a bonus wagering game run together with a base wagering game. The method includes receiving entries for the base wagering game from a player and an indication that the player also wants to participate in the bonus wagering game. The method includes determining at least one outcome of the base wagering game based at least in part on the received entries. The method includes providing information to the player that allows the player to determine the outcome of the base wagering game. The method includes awarding a prize in the base wagering game to the player based on predetermined rules, the prize depending on the at least one outcome. The method includes entering the entries into a plurality of subsequent bonus games, each with a bonus outcome, and awarding a bonus prize to the player based at least in part on the bonus outcomes.

Optionally, in addition to or instead of the other optional features, the example method may include determining the player's rank compared to a set of other players participating in the bonus game, the rank being determined according to predetermined criteria and based on the bonus outcome, where the awarding a bonus prize may include awarding a bonus prize based at least in part on the player's rank.

Optionally, in addition to or instead of the other optional features, in the example method, awarding a bonus prize may include awarding the player one or more tokens based at least in part on the bonus outcomes.

Optionally, in addition to or instead of the other optional features, in the example method, the tokens can be traded for an attribute enhancement in a third game, wherein the third game has a third outcome.

Optionally, in addition to or instead of the other optional features, in the example method, the third game is a fantasy role playing game.

Optionally, in addition to or instead of the other optional features, in the example method, the third game is a fantasy sports game.

Optionally, in addition to or instead of the other optional features, the example method may include awarding a second bonus prize, based at least in part on the third outcome.

Another example embodiment of the present invention includes a method of facilitating a bonus Keno game run together with a base Keno game. The method includes receiving an entry from a player who wants to enter the game, receiving pick numbers from the player for the base Keno game, providing the player a receipt showing the pick numbers, randomly determining draw numbers for the base Keno game, determining the number of draw numbers matched by the pick numbers for the player, determining the base Keno game prize award for the player, awarding the base Keno game prize award to the player according to predetermined game rules, entering the pick numbers in a plurality of subsequent drawings, and awarding a bonus prize to the player based on the outcome of the plurality of subsequent drawings.

Another example embodiment of the present invention includes a method of facilitating a wagering game. The method includes receiving a selection from a player, generating a first outcome, awarding a first prize to the player based at least in part on the selection and the outcome, comparing the selection with a plurality of subsequent outcomes, providing a quantity associated with the player based at least in part on the comparisons, ranking the player among a plurality of other players, wherein each of the players in the plurality of other players has an associated quantity, wherein the ranking is based at least in part on the associated quantities, and awarding a second prize, based at least in part on the rank of the player.

Optionally, in addition to or instead of the other optional features, in the example method, the plurality of subsequent outcomes may be a contiguous subset of an indefinite number of subsequent outcomes.

Optionally, in addition to or instead of the other optional features, in the example method, each player may have an associated selection, and each associated selection is compared against a plurality of subsequent outcomes, and at least one outcome from the plurality of subsequent outcomes associated with a player selection may be different from all the outcomes from the plurality of subsequent outcomes associated with a different player selection.

Optionally, in addition to or instead of the other optional features, in the example method, a presentation of the ranking may be available to any player, and wherein the presentation may be updated based on the occurrence of one or more subsequent outcomes.

Optionally, in addition to or instead of the other optional features, in the example method, the ranking may be based entirely on the associated quantities.

Optionally, in addition to or instead of the other optional features, in the example method, the ranking may be based at least in part on each player's performance in a game, wherein each player may be provided the ability to enhance their performance in the game based at least in part on each player's associated quantity.

Optionally, in addition to or instead of the other optional features, in the example method, the game may be an online role playing game.

Another example embodiment of the present invention includes a computer readable medium having stored there on a set of computer-readable instructions configured, when executed by a processor, to cause the processor to control the performance of any of the methods described in this or any related application.

Another example embodiment of the present invention includes a system for facilitating the play of a base game and extended play game. The system includes an input device configured to receive entries from a player for the base wagering game, and to also receive an entry from the player for the extended play game, an entry module configured to record and process the entries received from the player in the base wagering game, a random result generator configured to determine base game results, a base game outcome determining module configured to determine prizes awarded to the player based on the base game results and on the player's entries in the base wagering game, and a multiple player game outcome determining module configured to determine the ranking of a group of players in the extended play game, the ranking being dependent on the results the individual players in the group obtained across a series of base games, and to award a prize to a winning player in the group based on the ranking after the series of base games have been completed.

Optionally, in addition to or instead of the other optional features, in the example method, the base game may be a numbers draw game, and the player entries may include selected numbers to be matched against a series of numbers drawn by the random result generator.

Optionally, in addition to or instead of the other optional features, in the example method, the base game may be Keno.

Optionally, in addition to or instead of the other optional features, in the example method, the ranking may be based on the total quantity of drawn numbers the players selected numbers match across the series of base games.

Optionally, in addition to or instead of the other optional features, the example method may include an Internet interface configured to allow the players to check their current ranking in the extended play game.

BRIEF DESCRIPTION OF THE DRAWINGS

FIG. 3 illustrates an example procedure, according to one example embodiment of the present invention.

FIG. 6 illustrates an example online leader board, according to one example embodiment of the present invention.

DETAILED DESCRIPTION OF EXAMPLE EMBODIMENTS

Figure 1A:
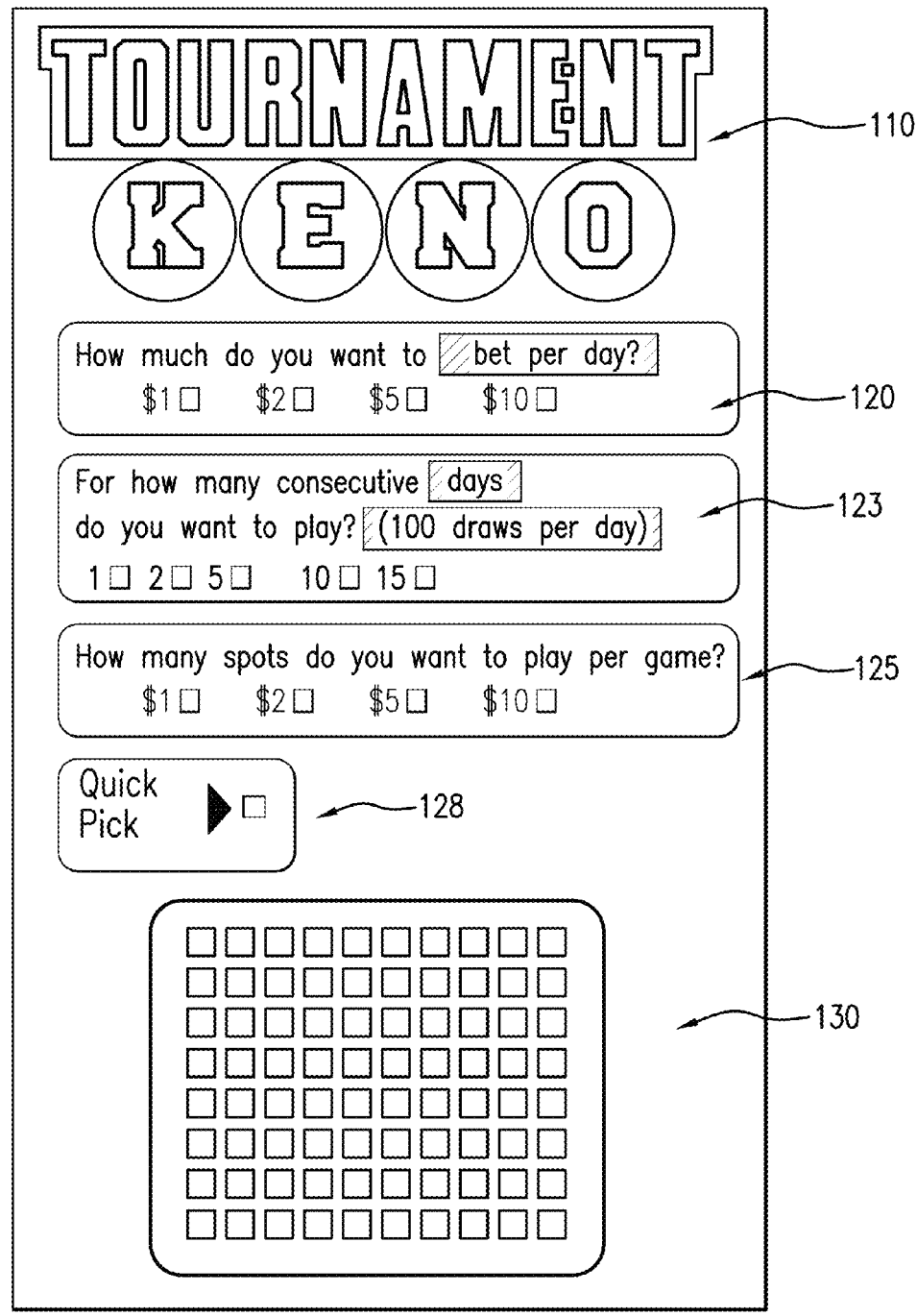
FIG. 1a illustrates a diagram of an example entry slip, according to one example embodiment of the present invention.

Applicant believes that the appeal of wagering games, particularly online drawing games such as Keno, may be increased by (a) providing extended play over a longer time period, (b) providing competition between players over the extended time period, (c) providing a bonus game in addition to a base wagering game, particularly if the bonus game is connected with the extended play and competition features.

Some example embodiments of the present invention provide an extended play of a drawing game over a longer than normal time period. For example, Keno might be played over thousands of draws and a multi-day period. Players can monitor their progress by checking in on the game over the Internet. Some example embodiments of the present invention also include systems and procedures for encouraging a higher volume of bets by providing a compelling bonus game supplemental to the traditional base game.

Some example embodiments of the present invention are directed toward the number selection game called "Keno," although it will be appreciated that they may be adapted by other types wagering games, particularly those based on number draws. The basic game of Keno has eighty numbers, numbered one to eighty. The player selects a certain quantity of numbers, which is called a "spot." So for example, if a player is allowed to select six of the eighty numbers, that ticket is referred to as a "six-spot." The player's selected numbers are the player's guesses as the drawing outcomes, e.g., the players "lucky numbers". After a certain window of time has closed, betting for a particular game may end and the Keno operator may randomly select twenty of the eighty numbers. The player may then be paid a certain prize depending on how many of the player-selected numbers are in the twenty numbers the operator selected. Each number from zero to the total spot value has an associated probability. So for example, in a two spot the player selects 2 numbers from the eighty available. Of those two numbers, none, one, or two may be found in the twenty selected by the operator. Each of those outcomes has an associated probability (e.g., it is approximately 56% likely none of the player-selected numbers are in the twenty, 38% likely one number is in the twenty, and 6% likely both numbers are in the twenty). The payouts associated with the various outcomes may change and depend on the game operator. The payouts should be set so that the expected value of the overall game is in the operator's favor.

An example set of probabilities was discussed with reference to a 2 spot ticket. However, the probability of any outcome on any sized ticket may be calculated with the following equation: $P_n(k)=((n \text{ choose } k)*(80-n \text{ choose } 20-k)/(80 \text{ choose } 20))$. In the equation "x choose y" is short for $(x!/(y!*(x-y)!))$. In the equation "n" is the size of the spot (e.g., n would equal six for a six-spot ticket). In the equation "k" is the number of spots the player selected that are found in the twenty spots the operator selected. The probability of selecting k numbers on an n-spot ticket is therefore $P_n(k)$. In a number selection game that does not follow the basic 80/20 rule of Keno the equation above may still be used to calculate the probabilities of any outcome by replacing 80 with the total possible numbers in the number selection game, and replacing 20 with the quantity of numbers the operator selects. Other embodiments of the present invention will be implemented with a variety of games including number selection games that do not use the standard 80/20 rule of Keno.

FIG. 1a illustrates an example entry slip, according to one example embodiment of the present invention, implementing the Keno game as an example. FIG. 1a illustrates one example of how to present the choices of the procedure to the customer; others may include an example play on an example input display on a computer, an Internet page, or other input mechanisms collecting similar information from the player. Display area 110 shows the name of the game, e.g., "Tournament Keno", and may also provide other information such as the name of the game operator, logos, or advertising. Bet amount input area 120 may provide input options for how much a player will bet, e.g., the amount bet per day for a fixed number of base game draws as illustrated here, or alternatively the amount bet per base game draw. In this example, the player may wager $1, $2, $5, or $10 per day, for a fixed 100 base game draws per day. Game length input area 123 allows the player to specify how long they desire to play the game, e.g., in this example the number of days, or alternatively the number of consecutive base games may be played for this ticket. In this example embodiment, the daily wager of 120 is divided among all the draws, e.g., 100, on a game day. For example, if $1 is selected, the player will wager 1$ per day entered, and wager 1 cent per drawing. Bet type input area 125 allows the player to select what type of bet to make, e.g., in this example how many numbers the player will select or what number "spot" will be played. The odds of winning and payout table may be different depending on the particular bet selected, e.g., number of spots selected. The pay tables may be specified by the game operator according to the expected value equation described above, and the profit ratio desired by the operator. The pay tables may also be displayed on game instructions, or on the back of the play slip. Alternatively, the ticket may omit a spot selection option, and the game may be of a fixed spot size, e.g., all games are a 10-spot. Quick pick selection area 128 provides the player an opportunity to indicate that the player would like the number selections randomly generated by the operator. This is typically referred to as a "quick-pick" and 128 is labeled as such. Game entry selection area 130 provides a location for the player to enter the number selections the player has chosen for game entry. It will be appreciated that in other types of base wagering games, other choices could be made, e.g., which team will win in a sports betting game, or which entrant in a race will win a racing game. In the illustrated example, each square may include a visible number from 1 to 80 in it, and the player may select the quantity of numbers specified in 125. Selections may be made by marking with a writing instruction, by entry with a keyboard or touch screen, or by other approaches. The entries made on a play slip may be scanned and recognized by a terminal, or may be manually entered into the system by a clerk. It will be appreciated that while FIG. 1a is illustrated as a paper ticket with 4 option blocks plus a number selection grid, alternative embodiments may have more options or fewer options. Other alternative implementations could include a video terminal, computer, mobile phone, Internet website, PDA, or any other system capable of receiving appropriate player input.

Figure 1B:
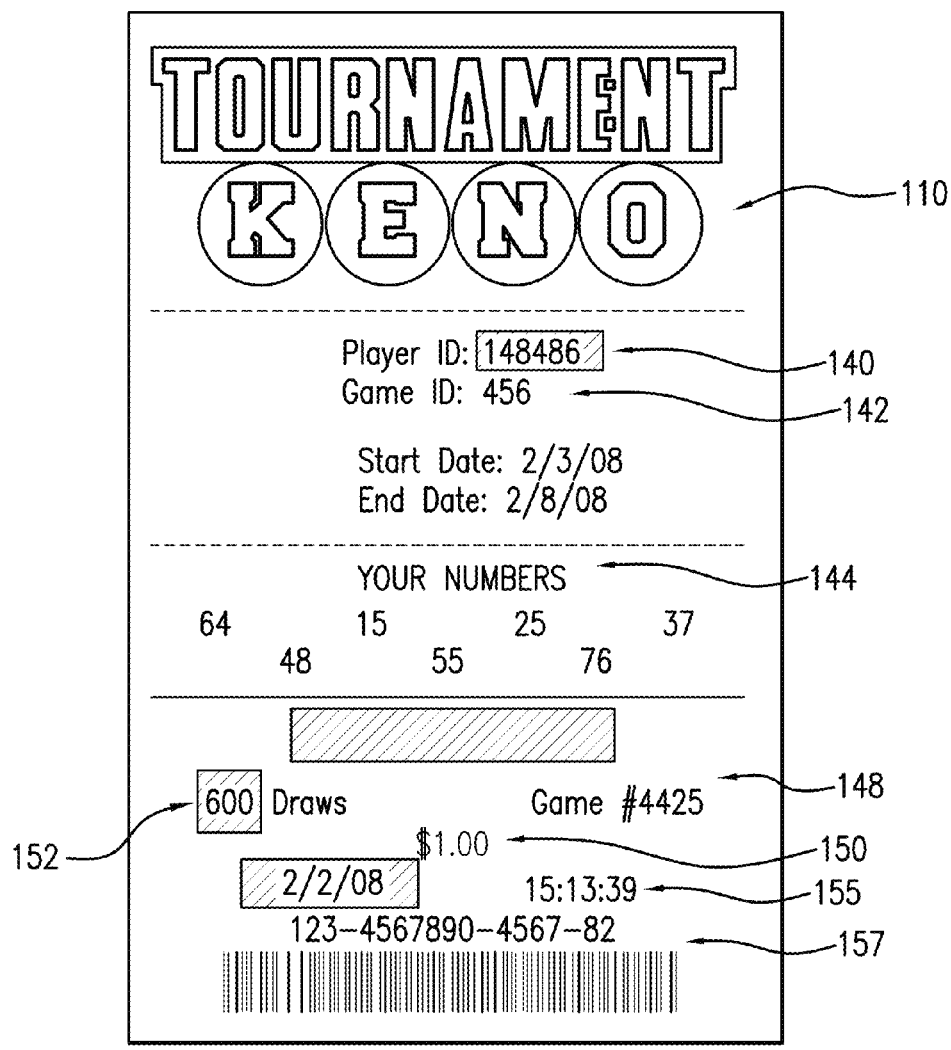
FIG. 1b illustrates an example entry receipt, according to one example embodiment of the present invention.

FIG. 1b illustrates a diagram of an example game receipt, according to one example embodiment of the present invention. The example game receipt is illustrated her as a printed ticket. The ticket may be issued to a player, e.g., after submission of the entry ticket of FIG. 1a. However, it will be appreciated that other types of receipts, e.g., electronic receipts including a digital signature, secure electronic smart card records, or other types of electronic account records may also be used. Game information display 110 again shows the name of the game, for example "Tournament Keno", in this example embodiment. Identification information 140 may show the player ID number and game ID number. Game time information display area 142 may show the estimated start date and end date of the game Player selection display area 144 may show the selections made in 130. Game length 152 may show the selection made in 123, e.g., the number of draws the player has entered. Game number 148 may show the game number of the first of the set of consecutive games that the player holding this ticket has entered. Bet amount 150 may show the per day wager of the ticket, e.g., what was entered in 120. Alternatively, other amounts could be given, e.g., the wager per draw. Date/time display area 155 may show the date and time the receipt was printed. Authentication code 157 may show the ticket serial number, in both a human and machine readable form, e.g., encoded in a barcode. This information may include a variety of things, including what games are part of the base game, and what games are part of the bonus game, and a cryptographically secure authentication number that is received as part of the ticket purchase procedure. Other information may be included or omitted from the example receipt illustrated in FIG. 1b as the specific implementation may require.

FIG. 3 illustrates an example procedure for facilitating the play of an extended play game with an interplayer tournament and a base wagering game, according to one example embodiment of the present invention. FIG. 3 illustrates the example procedure followed by one or more players on the left side of the figure, and on the right side a procedure for facilitating the operation of the game that operates concurrently with the procedure that may be performed by the players. The example procedure for facilitating the operation of the game may be performed, e.g., by a game system used by the game operator, such as a state lottery, a casino operator, or contractor.

At 305, the example procedure may wait for a player who wishes to enter the extended play game. Players may enter the game in a variety of ways, e.g., by bringing a play slip to an agent, by using a dedicated self-service game terminal that read play slips or allows other forms of player data entry, via a personal computer, a cell phone, or a PDA, etc. At 310, a player may give a wager amount and play selections. These, along with certain game options, may then be transmitted to the game operator, which at 315, may receive them. At 317, the example procedure may aggregate the players who have chosen to enter the tournament game with compatible options in a tournament setup. For example, all players who have chosen the same spot number may be entered in a tournament pool for a day. If tournaments can last multiple days, players may be aggregated who have bet on the same period of time for the extended play game. Alternatively, procedures may allow players to form their own tournament groups, and play against each other, e.g., using the approaches described in concurrently filed U.S. provisional application METHOD AND SYSTEM FOR FACILITATING INTER-PLAYER WAGERING IN CONJUNCTION WITH A BASE GAME, Ser. No. 61/070,974, to Barnes et al.

At 320, once the tournament has been established, and the various players game entries have been received and recorded, base game outcomes may be generated. These may be generated by any approach, such as random number selection using a physical apparatus, computer random number generation, or reference to external events such as sports results. In the example illustrated here, the game results for the base game may be generated using a conventional software controlled Keno system or similar online lottery system.

At 325, the example procedure may display the base game outcome, e.g., by displaying the Keno game results to the players, or by allowing players to access a log of the results via the Internet. At 330, the player may view the base game outcome results 328. For games playing over extended periods of time, e.g., days, the players may periodically log in or access an Internet site to see the results of all the base games that have occurred. Alternatively, players may also automatically receive email or text message notification of the results of each base game.

At 332, the example procedure may issue any base prizes. At 335, the player may receive any base prize 333. Players may claim their base game prizes at any time, e.g., by presenting a game ticket for redemption. Alternatively, for ease of administration, all base claim prizes could be credited to a player account automatically. In another alternative, base game prizes might only be collected as a single lump sum, after the completion of all the games associated with a ticket.

At 340, the operator may issue bonus points, and at 345, the player may receive the bonus points 343. These bonus points may be used in a bonus game run as an adjunct to the base game and tournament game. Alternatively, bonus prizes could be awarded at various stages of the tournament game, e.g., to each player who is in first place at a particular intermediate point of the game. In another alternative, players could receive bonus points in the tournament game based on special results in the base game, e.g., a player who gets no matches whatsoever in the base game, might get a consolation prize of extra points in the tournament game. It will be appreciated that other alternative bonuses and bonus games may also be provided.

At 348, the example procedure may update the ranking of all the players in the tournament. At 355, the player may view the ranking 353. For example, in the Keno example, a player's ranking may be based on the total number of matched numbers in all the base Keno games that have been played so far. Other alternative are also possible, e.g., total prizes won in the base game. At 350, the example procedure may display the current rankings to the players. This display could be on a publicly viewable screen, e.g., on a casino or Keno parlor floor, at an individual terminal, or on a personal device connected via a network, e.g., a computer or mobile phone connected via the Internet. Updates in rankings may also be made available on an Internet site in real time, or periodically, or may be actively distributed periodically, e.g., every hour, by sending a ranking update via email or text messaging.

Until a terminating event occurs at 360, the example procedure may continue to generate outcomes, issue points, and update the rankings. For example, in the illustrated example shown previously, a player may enter the tournament for a fixed period, e.g., a day or a week, with a fixed number of predetermined draws, e.g., 100 or a 1000. Alternatively, other termination criteria besides a fixed number of base games or fixed time period may be employed, e.g., the game might proceed indefinitely, until a player reaches a predetermined score.

At 363, after a terminating event, e.g., the number of extended play rounds has been reached, a tournament prize 365 may be awarded. For example, at 370, the top ranked player may receive a predetermined bonus prize.

Figure 2A:
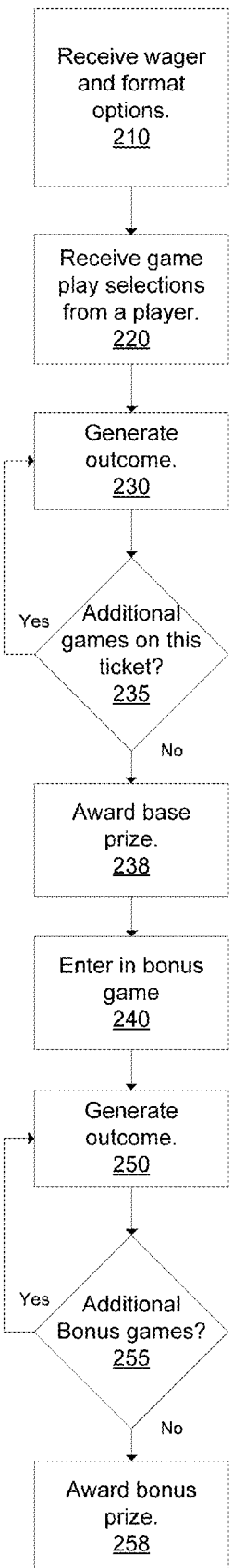
FIG. 2a illustrates an example procedure, according to one example embodiment of the present invention.
Figure 2B:
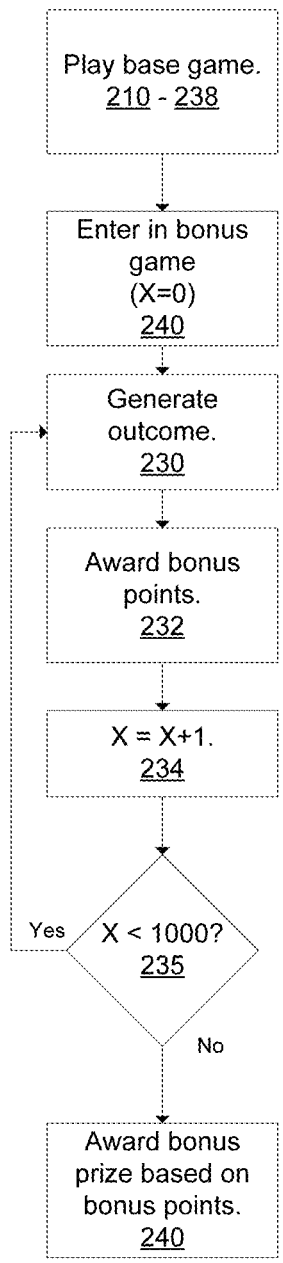
FIG. 2b illustrates another example procedure, according to one example embodiment of the present invention.
Figure 2C:
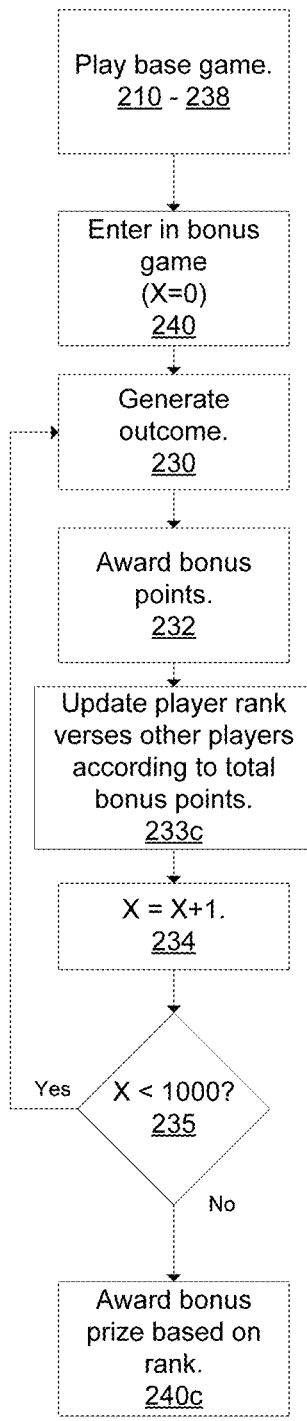
FIG. 2c illustrates another example procedure, according to one example embodiment of the present invention.

FIGS. 2a-2c illustrate procedures for facilitating the play of an alternative extended play game, according to an example embodiment of the present invention. FIG. 2a illustrates an example procedure for facilitating the play of the alternative example game, according to an example embodiment of the present invention. At 210, the example procedure may receive a wager and various format options, e.g., information from areas 120, 123, 125, and/or 128 on the play slip illustrated previously. Information may be received by reading it directly from a play slip, or by having a clerk or player manually enter the information at a terminal, computer, mobile phone, or other information processing device. At 220, the example procedure may receive game play selections for a player, e.g., the numerical pick information in area 130 in the play slip previously illustrated. It will be appreciated that for other base wagering games, appropriate information may be requested and received, e.g., sport wagers, casino game bets, etc At 230, the example procedure may generate an outcome, e.g., in the Keno game example, the twenty "winning" numbers in the Keno game may be drawn or generated. At 235, the procedure may loop back repeatedly for the length of the game, e.g., for the predetermined number of draws in a daily game, or for a particular number of draws chosen by the player. Alternatively, the game period may be indefinite, ending when a predetermined event occurs, e.g., a player reaching a particular score in the extended play game. At 238, the example procedure may award a base prize. The base prize may be the sum of all the consecutive base game prizes, where each game outcome receives the prize as indicated by a pay-table, the prize being the prize that would normally be awarded in the base game. At 240, subsequent to the base game, the example procedure may enter the player in a series of bonus games. At 250, the example procedure may generate an outcome. At 255, the procedure may loop back for as many times as the player is going to be entered into bonus games. This may be 10 games, 1000 games, 10,000 games, or any number. The number of bonus games may be awarded per ticket (e.g., 1000 games no matter what options are selected. The number of bonus games may be awarded per base game (e.g., 2000 games for 2 consecutive base games, 5000 games for 5 consecutive base games, etc). The number of bonus games may be awarded per dollar wagered (e.g., 5000 bonus games for 1 base game at $5, 5000 bonus games for 5 base games at $1). The number of bonus games may be tied to any number of criteria to encourage player participation in the base game. At 258, a bonus prize is awarded according to the bonus outcomes.

Figure 2D:
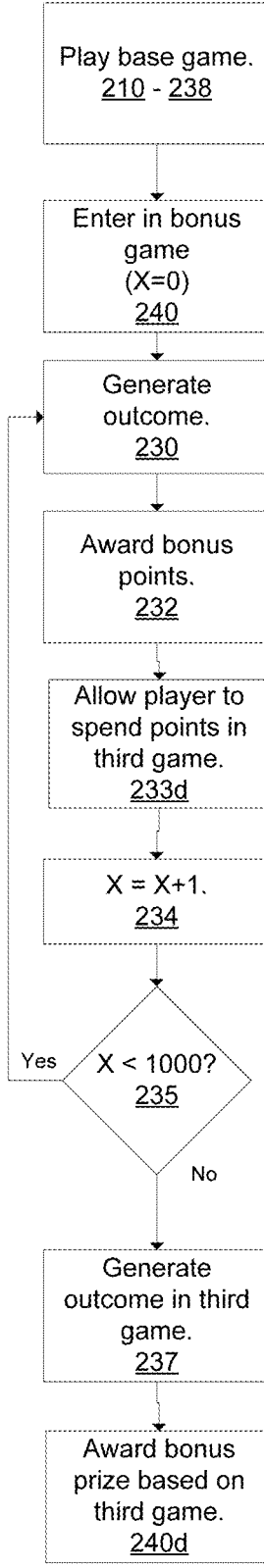
FIG. 2d illustrates another example procedure, according to one example embodiment of the present invention.

FIGS. 2b, 2c, and 2d illustrate different embodiments of how the bonus games may work. FIG. 2b is substantially similar to FIG. 2a at 210 to 238 with respect to the base game. At 240, this example procedure may enter the player in a bonus game. At 230, the example procedure may generate an outcome. At 232, the example procedure may award the player bonus points depending on the outcome. For example, the base game may be Keno with 10 number selections. The bonus game may be a subsequent Keno draw that the original 10 number selections are compared against. The player may then be awarded points based on how well the player did in that subsequent Keno game. The player may receive one point for every correct number in the bonus draw, or may receive points according to a pay-table, e.g., more improbably outcomes receive more points. It may be appreciated that no specific "bonus" draw needs to be set up. A typical Keno operator may draw 100s or 1000s of Keno games a day. The player may be entered into a drawing for the base game and be awarded a certain monetary prize according to a pay-table. The player may then be entered into 1000 subsequent drawings as a bonus game, where the player receives points according to a point pay-table, instead of a cash prize. At 234, the example procedure may increment a bonus game counter, and at 235 may loop back if more bonus rounds are needed. At 240, a bonus prize may be awarded according to how many points were won. In this example embodiment, the player has been awarded 1000 bonus games, but the plurality of bonus games awarded to the player could be any number.

Example embodiments of the present invention may allow for 100s or more bonus games after a base game. With so many drawings, a player could not expect to keep track of the results of each, and the running point total for those results. As such, each embodiment of the present invention may provide for an on-line system, where the player may log on and check the specific player's running total, final total, and bonus award, if any.

FIG. 2c is substantially similar to FIG. 2b, with an added step of updating a player's rank after each bonus drawing. This example procedure may rank all of the game's players, for example on an online ranking board. After each bonus drawing, each player may log on to check their rank as compared to the other player's and how many bonus points the other players have been awarded. At some terminating event (e.g., a fixed date/time) the highest ranked player may be awarded a bonus prize, e.g., at 240c. FIG. 6 illustrates an example of an online rankings board, where players may check their current rank in the bonus game.

FIG. 2d is substantially similar to FIG. 2c, except at 233d the player is offered the opportunity to spend bonus points on a third game. The example procedure may also update a player ranking according to bonus points or standings in the third game. In this example procedure bonus points may be used to purchase things that may contribute to a bonus prize. For example, 10 points may be spent on a free entry in another wagering game. Alternatively, the third game may be a fantasy role playing game. For example, the third game may be fantasy baseball. Normally, a player may choose a fantasy baseball team, from among professional athletes of various teams, the fantasy team is then ranked among other fantasy teams, based on the real life performance of each player which corresponds to a fantasy player on the fantasy team.

Some of the example embodiments of the present invention add an element to this fantasy game, by allowing players to exchange the bonus points awarded in 232 for fantasy game player enhancements. For example, a player may be able to purchase a strength bonus for one of the fantasy baseball players at a cost of 100 bonus points. Then, for example, if that player hit 2 home runs during that week, the fantasy player may receive credit for 3 home runs. The player may be able to purchase a speed bonus during the week for 50 Keno bonus points, such that if the real player steals 4 bases that week, the fantasy player may be credit for 5 stolen bases. As an alternative to fantasy sports, which is typically tied into real world statistics, a totally virtual world may be created. Teams may be assembled and attributes purchased for players who do not correspond to real world players (e.g., like many role playing computer games). The teams may play each other, with outcomes determined by a combination of the attributes of the players and a random number generator; such that the better one team is the more likely that team will win.

The virtual game does not need to be sports based. Alternative embodiments may include any number of games, including war games, medieval army or fantasy-based games, city building games, explorer games, or any other kind of multi-player game. In these alternative example embodiments, the game may be enhanced by exchanging bonus points awarded by the bonus game (e.g., bonus Keno rounds) for game enhancements in the virtual reality game.

Though the game of Keno as the base and bonus game was used to illustrate the example procedures described above, it should be appreciated that other games may be used to implement these procedures, e.g., slot machines, or video slot machine games. Here, a player may be eligible for a monetary prize during a base play of the slot machine (e.g., a standard slot play), and receive bonus points according to the outcome of the next 1000 plays at that machine. Again, a running total of the player's bonus points may be checked online, and a players rank, as compared to other players, may be maintained. Other embodiments may use video poker, lottery terminals, or any other game to encourage more wagers by introducing a plurality of bonus awards subsequent to a base game. Another example may include video poker. In that example, each hand may receive the traditional prize according to the probability of that outcome, but the player may receive additional bonus points for the next 1000 hands dealt on that machine.

It will be appreciated that any of the above illustrated procedures may be implemented on a video game terminal, on a personal computer connected to the Internet, with paper or electronic tickets sold at retail establishments, as part of a state lottery, as part of a multi-state lottery, on a mobile device such as a mobile phone or PDA, or with any other devices capable of facilitating the procedures illustrated above. Additionally, a player may be allowed to select what numbers that player would like to play in the game, or a player may be allowed to have those numbers generated for the player, e.g., a "quick-pick".

Figure 4:
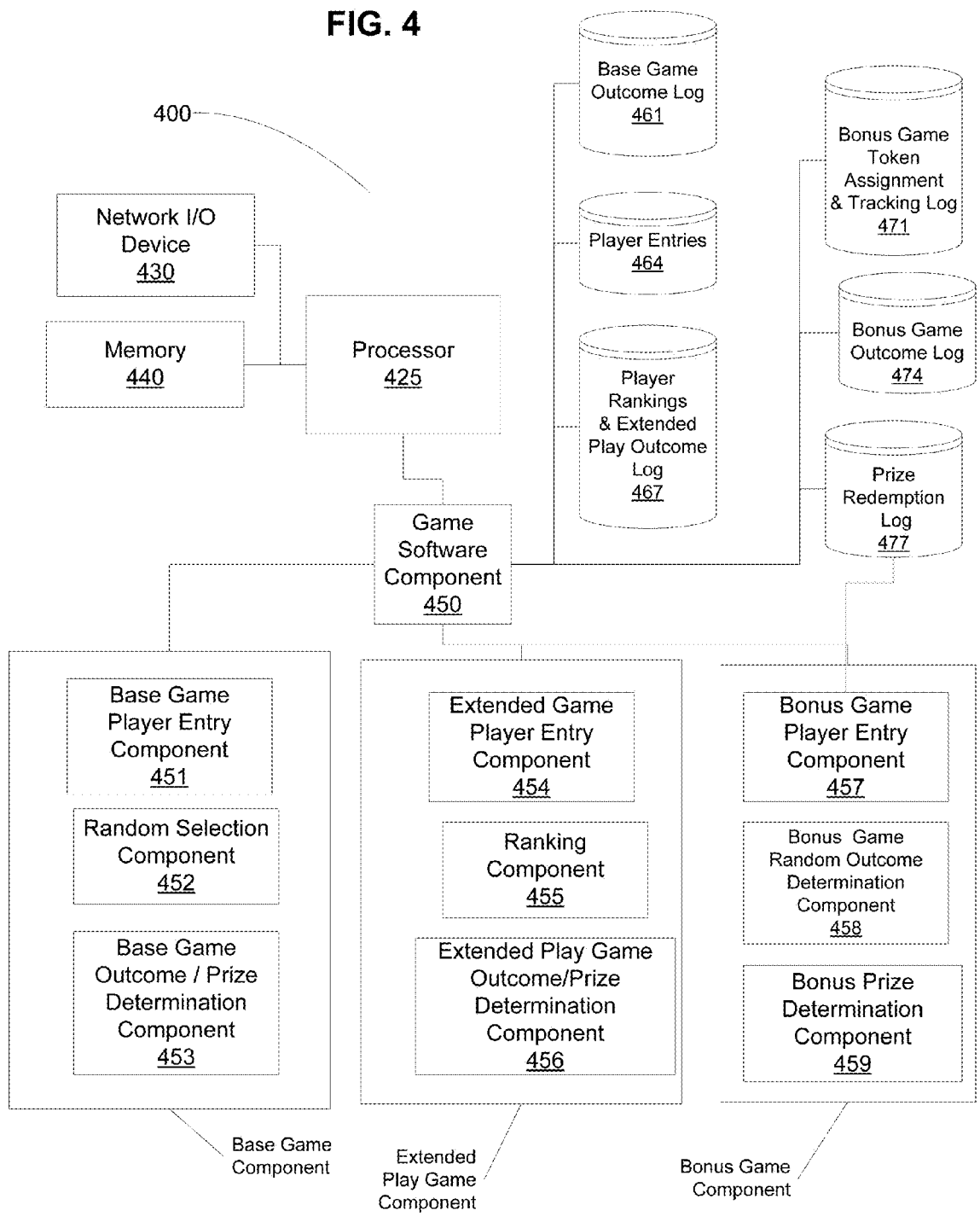
FIG. 4 illustrates a block diagram of an example game server according to one example embodiment of the present invention.

FIG. 4 illustrates a block diagram of an example game server according to one example embodiment of the present invention. System 400 may have a processor 425 in communication with several peripherals. The system 400 may include memory 440 to store various pieces of data for the execution of the game software, or any other needed software. The system 400 may also include a network I/O device 430. The network I/O device 430 may be, for example, a serial port which may connect to a telephone line, a high-speed Internet connection, or any other network connection.

The example system 400 may include several data logs. The system 400 may include a base game outcome log 461, a player entries log 464, and a player rankings and extended play outcome log 467. The system 400 may also include a bonus game token assignment and tracking log 471, a bonus game outcome log 474, and a prize redemption log 477. The system 400 may include other data repositories, and all stored data may be fully auditable and provide a complete or partial history of all transactions. It will be appreciated that the stored data may be stored in any convenient data structure, including flat files of predetermined formats, relational databases, etc.

The example system 400 may also include a game software component 450. The game software component 450, may include a base game component (Insert #). The base game component may include a base game player entry component 451, a random selection component 452, and a base game outcome and prize determination component 453. These software components may be used to run a base game, and produce outcomes used to determine player prizes. The various base game components are substantially identical to the software used to operate the base game in a non-extended play fashion, although they may need to be modified to allow for different types of long term entries, e.g., multi-day play with large numbers of drawings.

The game software component 450 may include an extended play game component. The extended play game component 456 may include an extended game player entry component 454, a ranking component 455, and an extended play game outcome and prize determination component 456. These components may be used to rank players among the other players in a tournaments, e.g., by receiving the results of the base game for each player, applying the predetermined tournament rules, and producing a ranking. The system 400 may allow players to view their ranking after each base game outcome, and how the ranking has changed over time.

The game software component 450 may include a bonus game component (Insert #). The bonus game component may include a bonus game player entry component 457, a bonus game random outcome determination component 458, and a bonus prize determination component 459.

Figure 5:
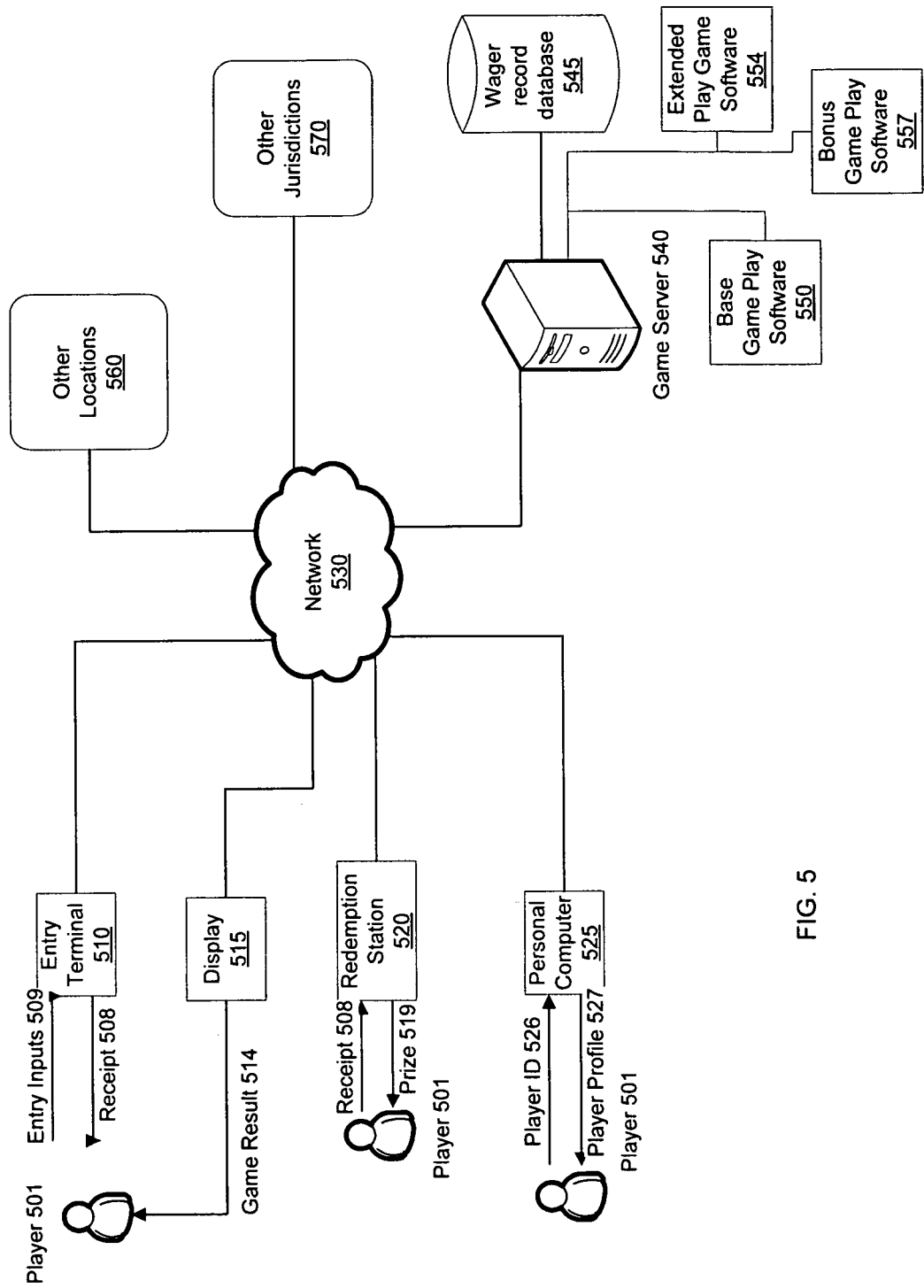
FIG. 5 illustrates a block diagram of an example distributed system according to one example embodiment of the present invention.

FIG. 5 illustrates a block diagram of an example distributed system according to one example embodiment of the present invention. FIG. 5 illustrates how the game may be distributed over a network 530. A player 501 may use an entry terminal 510 to make game selections and wager selections. The player 501 may also use the terminal to enter a wager selection or insert the actual wager. In other example systems, the player 501 may not interface directly with the entry terminal 510, but may go to a retail clerk who enters the information into the entry terminal 510. The player 501 may be issued a receipt 508 for the entry. Where the player utilizes a personal device, such as a mobile phone, or personal computer, for example, the game results 514 may also be communicated to that personal device for viewing and/or storing either in addition to or in lieu of the player taking possession of a receipt 508.

The system may have a display 515 that shows player 501 the game results 514. In other example systems this may be implemented with a speaker that announces the numbers or through a human announcer.

The system may have a redemption station 520 where the winning player 501, having physical receipt 508, may enter the receipt 508 or information from the receipt 508 to receive a base prize 519. The network 530 may be configured to interface with other locations 560 and other jurisdictions 570. The system may have a game server 540 configured to run the games. The game server 540 may have a wager record database 545 to record wagers or any number of other historical data the operator may need to recall. The game server 540 may also have game software. There may be a base game play software 550, configure to facilitate the base game. There may be extended play game software 554, configured to facilitate a tournament game with many players. There may be a bonus game play software 557, configured to facilitate a bonus game. The system may also be accessed from a terminal, e.g., a personal computer 525, which may be a PC, mobile phone, retail terminal, etc. The player 501 may be able to enter player ID 526 (and optionally a pass-code) and view the player's profile 527. Here the player may see the current ranking as compared to other player's bonus point totals. Additionally or alternatively, the player may be able to view and manage the virtual players in a virtual or fantasy game. The personal computer 525 may be connected to the system by network 520, e.g., the Internet.

It will be appreciated that all of the disclosed methods, games, and procedures described herein can be implemented using one or more computer programs or components. These components may be provided as a series of computer instructions on any conventional computer-readable medium, including RAM, ROM, flash memory, magnetic or optical disks, optical memory, or other storage media. The instructions may be configured to be executed by a processor, which when executing the series of computer instructions performs or facilitates the performance of all or part of the disclosed methods, games, and procedures.

It should be understood that there exist implementations of other variations and modifications of the invention and its various aspects, as may be readily apparent to those of ordinary skill in the art, and that the invention is not limited by specific embodiments described herein. Features and embodiments described above may be combined. It is therefore contemplated to cover any and all modifications, variations, combinations or equivalents that fall within the scope of the basic underlying principals disclosed and claimed herein.

The invention claimed is:

1. A method of facilitating the play of an extended play competitive wagering game based on a base wagering game, comprising:
   receiving wagers from a plurality of players in the extended play wagering game;
   repeatedly
      determining an outcome of a round of the base wagering game for each of the plurality of players;
      responsive to determining the outcome of the round of the base wagering game, updating a player ranking of the plurality of players based on the determined outcome of the base wagering game, the ranking based on aggregate results of each player in the plurality of players over the rounds of the base wagering game that have occurred;
      displaying a ranking of the plurality of players based on the outcome of the rounds of the base wagering game that have already occurred; and
   at the conclusion of all of the rounds of play of the base wagering game, awarding one of the players a prize in the extended play game based on the player's ranking after the final round of the base wagering game; and
   conducting a bonus game in parallel with the plurality of base games and the extended play game, wherein the likelihood of a player winning the bonus game depends at least in part on the player's received outcomes in the base game and the extended play game.

2. The method of claim 1, further comprising: awarding players prizes for their results in the base wagering game, the prizes being independent of the results achieved by other players in the base wagering game.

3. The method of claim 1, wherein the base wagering game is an online numbers draw game.

4. The method of claim 1, wherein the base wagering game is Keno.

5. The method of claim 1, further comprising: displaying base game results and player rankings over the Internet.

6. The method of claim 5, wherein the base wagering game is an online numbers draw game, and the ranking is based on a total quantity of number matches made by players in all the base wagering games that have been completed.

7. The method of claim 1, wherein receiving wagers further includes receiving selections of numbers to be matched in an online numbers draw game.

8. The method of claim 1, further comprising: awarding bonus tokens to a player based on at least one of their outcome one of the base games or the player's ranking in the extended play game, the bonus tokens configured to be used at the discretion of a player to increase their expected payout in the bonus game.

9. The method of claim 8, wherein the bonus game has a sports theme with characters who have performance attributes, the likelihood of a player winning the bonus game depending on the attributes of the player's assigned characters.

10. The method of claim 9, wherein the tokens are configured to be used to increase fictional character attributes in the sports-themed game.

11. An article of manufacture comprising a computer readable medium having stored there on a non-transitory set of computer-readable instructions configured, when executed by a processor, to cause the processor to control the performance of a method of facilitating the play of an extended play competitive wagering game based on a base wagering game, comprising:
   receiving wagers from a plurality of players in the extended play wagering game;
   repeatedly
      determining an outcome of a round of the base wagering game for each of the plurality of players;
      responsive to determining the outcome of the round of the base wagering game, updating a player ranking of the plurality of players based on the determined outcome of the base wagering game, the ranking based on aggregate results of each player in the plurality of players over the rounds of the base wagering game that have occurred;
      displaying a ranking of the plurality of players based on the outcome of the rounds of the base wagering game that have already occurred; and
   at the conclusion of all of the rounds of play of the base wagering game, awarding one of the players a prize in the extended play game based on the player's ranking after the final round of the base wagering game; and
   conducting a bonus game in parallel with the plurality of base games and the extended play game, wherein the likelihood of a player winning the bonus game depends at least in part on the player's received outcomes in the base game and the extended play game.

12. A system for facilitating the play of a base game and extended play game, comprising:
   an input device configured to receive entries from a player for the base wagering game, and to also receive an entry from the player for the extended play game;
   an entry module configured to record and process the entries received from the player in the base wagering game;
   a random result generator configured to determine base game results;
   a base game outcome determining module configured to determine prizes awarded to the player based on the base game results and on the player's entries in the base wagering game;
   a multiple player game outcome determining module configured to determine the ranking of a group of players in the extended play game, the ranking being dependent on the results of the individual players in the group across a predetermined number of base games that the group of players complete, and to award a prize to a winning player in the group based on the ranking after the predetermined number of base games have been completed, and
   a bonus game module configured to conduct a bonus game in parallel with the base game and the extended play game, wherein the likelihood of a player winning the bonus game depends at least in part on the player's received outcomes in the base game and the extended play game.

13. The system of claim 12, wherein the base game is a numbers draw game, and the player entries include selected numbers to be matched against a series of numbers drawn by the random result generator.

14. The system of claim 13, wherein the base game is Keno.

15. The system of claim 12, wherein the ranking is based on the total quantity of drawn numbers each of the players' selected numbers match across the series of base games.

16. The system of claim 12, further comprising: an Internet interface configured to allow the players to check their current ranking in the extended play game.

* * * * *